US006793065B2

(12) United States Patent
Ziegler

(10) Patent No.: US 6,793,065 B2
(45) Date of Patent: Sep. 21, 2004

(54) TRANSPORT MECHANISM FOR PIECE GOODS

(75) Inventor: Manfred Ziegler, Ruderting (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 10/276,124

(22) PCT Filed: May 3, 2002

(86) PCT No.: PCT/EP02/04879

§ 371 (c)(1),
(2), (4) Date: Nov. 13, 2002

(87) PCT Pub. No.: WO02/091091

PCT Pub. Date: Nov. 14, 2002

(65) Prior Publication Data

US 2003/0205446 A1 Nov. 6, 2003

(51) Int. Cl.[7] .............................................. B65G 43/10
(52) U.S. Cl. ..................... 198/575; 198/572; 198/459.1
(58) Field of Search ........................... 198/459.1, 460.1, 198/461.1, 461.2, 570, 571, 572, 575, 576, 577

(56) References Cited

U.S. PATENT DOCUMENTS

| 4,904,916 A | 2/1990 | Gisske et al. |
| 6,325,198 B1 * | 12/2001 | Pattantyus-Abraham et al. ........................ 198/575 |

FOREIGN PATENT DOCUMENTS

| DE | 3131352 | 2/1983 |
| DE | 195 15 614 | 10/1996 |
| DE | 29710056 | 9/1999 |
| JP | 60-191884 | * 9/1985 ................. 198/575 |

* cited by examiner

Primary Examiner—James R. Bidwell
(74) Attorney, Agent, or Firm—Marshall, Gerstein & Borun LLP

(57) ABSTRACT

A transport mechanism for piece goods, such as bottles, can cardboards, trays or the like, which consists of at last two transporter sections that each have at least one drive unit of its own, which is adjustable in rotary speed, with a coordinated control module, with the control module connected with a central control-regulating unit for the transmission of signals. The control-regulating unit has at least one transmitter, and the control module has at least one receiver for wireless signal transmission, particularly by radio.

18 Claims, 2 Drawing Sheets

TRANSPORT MECHANISM FOR PIECE GOODS

This application is a 371 of PCT/EP02/04879 filed May 3, 2002.

FIELD OF THE INVENTION

The invention relates to a transport mechanism for piece goods, such as disposable beverage containers.

Transport mechanisms of this type are used, for example, in decanting- and/or packaging lines of the beverage- and food industry. As a general rule, a decanting line consists of several machines, which are set up separately and are linked, in the direction of material flow, by means of a single- or multiple-track transport mechanism, whereby a transporter connecting two machines at greater distances can be divided into several individual sections, each with its own drive unit. For the monitoring and control of the transport mechanism, a multiplicity of sensors, by means of which the loading and conveying speed of the individual transporter sections, among others, can be determined, are additionally present.

BACKGROUND OF THE INVENTION

Until recently, the control and regulation of such types of transport mechanisms, as well as of the processing machines incorporated, if applicable, were carried out by means of at least one central (SPS-) control device, by means of which, in the normal case, the frequency converters for the drive motors were also spatially coordinated with the individual transporter sections. This configuration disadvantageously brings about a star-shaped cable pattern with large cable lengths, as well as a high expense for assembly (DE 31 31 352 C2).

In order to avoid these disadvantages, it has already been proposed (DE 297 10 056 U1) to assign a converter, which is provided directly adjacent in spatial terms, to the individual motors of each transporter section, as the result of which only a ring circuit is still necessary to supply power to the drive motors. The cabling expense that is necessary for the transmission of the control- and sensor signals can likewise be drastically reduced through the use of a bus line. The bus line is connected with a central control-/regulating device (memory-programmable control device, industry PC, or the like). Although a notable simplification has already been achieved with this technique, the laying of a bus line still always requires some expense, most particularly if an existing transport mechanism should subsequently undergo spatial changes.

SUMMARY OF THE INVENTION

In contrast to this, the task that forms the basis of the invention is that of presenting a transport mechanism with a simplified and flexible signal transmission system.

By means of the proposed wireless signal data transmission (for control-, measuring-, or configuration data), a wire-bound data bus system can be advantageously dispensed with. This not only brings about a saving of cable material and a reduction in the work expenses for the installation of the data transmission system, but a simple adjustability is also advantageously present upon reconfigurations of the transport mechanism.

In accordance with one further development of the invention, sensors and/or actuators coordinated with a transporter section can be equipped with wirelessly-operating data transmitters or receivers, as the case may be, as the result of which signal lines for the control module can be dispensed with.

BRIEF DESCRIPTION OF THE DRAWINGS

One preferred form of implementation will be illustrated in following by means of the figures.

DETAILED DESCRIPTION OF THE INVENTION

Figure 1:
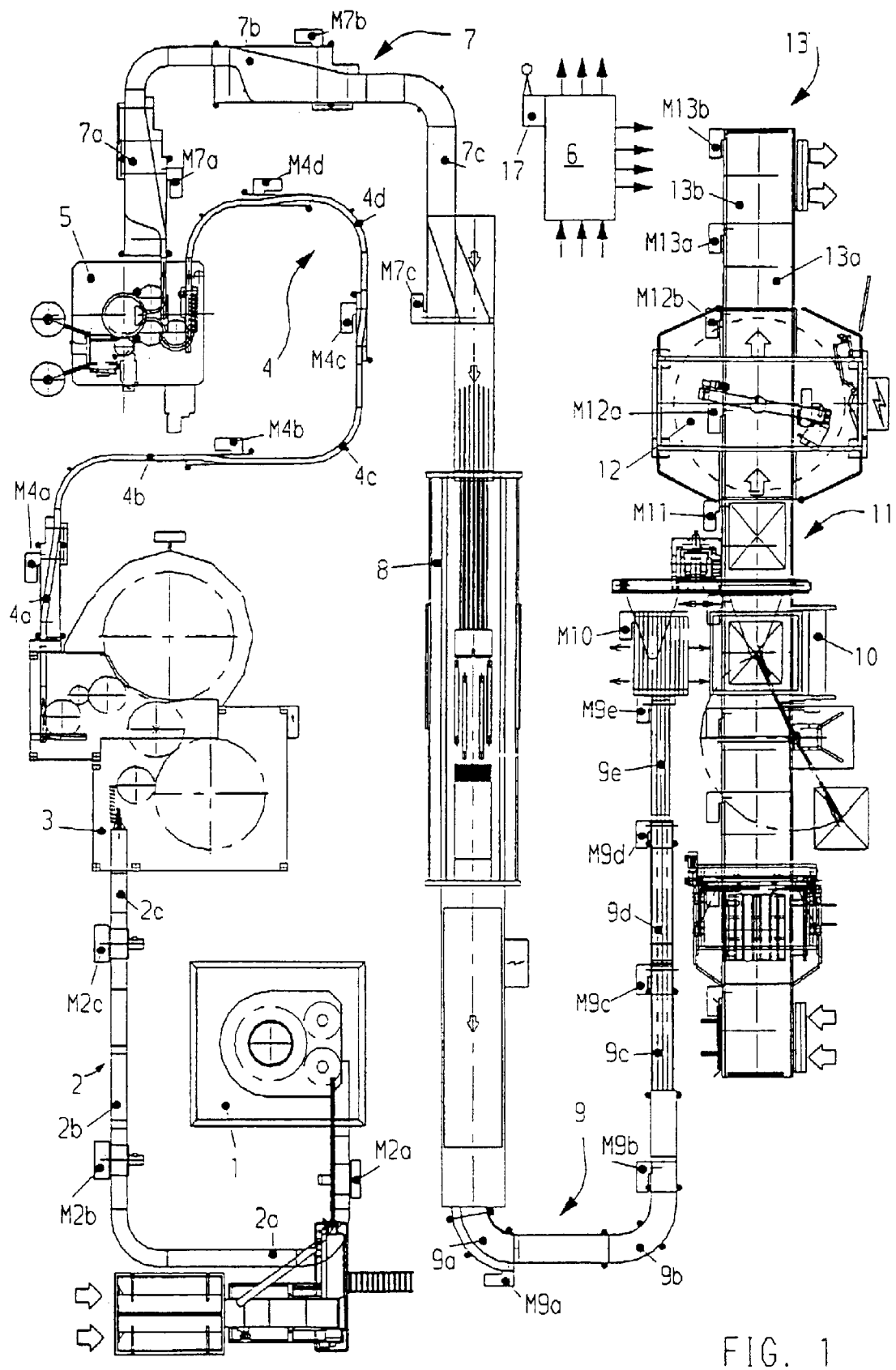
FIG. 1: Depicts a view from above of a beverage decanting line, in a schematic representation.

The decanting line depicted in FIG. 1 is set up for the manufacturing and filling of plastic bottles serving as disposable containers. It has a stretch blow molding machine (1) in which bottles are blown out from injection-molded plastic performs, which bottles are conveyed on a single track on a stationary air conveyer (2) to a machine block consisting of a rinser, a filling machine, and a sealing device (3). The said air conveyer (2) has, in the known manner, two support strips (not depicted), which are spaced in a manner corresponding to the neck diameter of the bottles to be transported and running in parallel, which support strips support a support ring integrally formed below the aperture of the bottle on the neck of the bottles, whereby the forward movement of the bottles is caused by air jets directed in the direction of transport. For the production of the air jets, the air conveyer (2), which has three sections (2a–2c), has the several blowing units, likewise in the known manner, which can be driven by means of electrical motors, whereby the control of the speed of conveying of the bottles is carried out through a controlled influencing of the quantity and/or speed of air. For this purpose, the rotational speed of the blowing unit drive motor (M2a–M2c), for example, can be changed, preferably in a continuous manner. The adjustment of the rotational speed can be carried out for all motors in common and synchronously with one another, but also singly—that is to say, individually—in the event of need.

After the rinsing out, filling, and sealing of the bottles in the machine block (3), a transfer of the sealed bottles to a labeling machine (5) is also carried out. For the transfer of the bottles, a conveyor (4) equipped with plate-type hinged-frame or mat-type chains, for example, is provided, which conveyor is subdivided into several sections (4a–4d) which can each be driven by means of at least one individual rotational variable-speed motor (M4a–M4d).

After being provided in the labeling machine (5), the bottles are moved, by way of a conveyor (7) likewise having several sections (7a–7c), each one with individual motors (M7a–M7c), to a packaging machine (8), in which they are grouped, wrapped in shrinking foil, or encased with a cardboard section and, if applicable, placed in display units, cardboard boxes, or chests.

The first section (7a) of the conveyor (7) is configured as a device for separating the bottles, which device brakes the stream of bottles having intermediate distances upon leaving the labeling machine (5) in a single track, and reshapes it into a multiple-track line of bottles. The separation of the bottles has conveyor belts, which can be driven in stages at different speeds and positioned next to one another, whereby the gradation of speed is brought about either by means of a mechanical sprocket wheel gear (FIG. 1), or by means of several individual drive motors (not depicted). The subsequently-following sections (7b, 7c), which are equipped with mat-type or hinged-frame chains, have a conveyor width that is designed for the multiple-track transport of bottles, and is thereby suitable for the, buffering of the bottles.

A container conveyor (9) (sections 9a–93, drive motors M9a–M9e) transports the containers from the packaging machine (8) to a palletizing machine (10) (drive motor M10 for the transport of the container layer), where several layers of containers are placed on a pallet in a layered manner one above the other, in layers of containers. The pallets that have been loaded are conveyed from the palletizing machine (10), by means of a rolling conveyor (11) with a drive motor (M11), to a foil packaging machine (12) (drive motors M12a, M12b) and, after that, through an additional rolling conveyor (13) (sections 13a,b) with drive motors M13a, M13b), to a storehouse or pallet removal point.

In the disturbance-free operation, the conveying speed of the individual transporter sections (7a–7c), which can be driven in a continuous manner, are adjusted by means of a control device (6) in such a manner that, on the one hand, sufficient bottles are always held ready for the interruption-free supplying of the packaging machine (8), in order to be able to bridge over short-term disturbances in the labeling machine (5) or the machine block (3), as the case may be, and, on the other hand, enough buffer surface is kept free on the conveyor (7) in order to be able, during a transitory standstill of the packaging machine (8), to accommodate the bottles coming out of the labeling machine (5) or the machine block (3), as the case may be. The speed of the sections (4a–4c) of the continuously-operating conveyor (4) is likewise adjusted by the control device (6) in a manner dependent upon the situation. The drive units (M2a–M13b) of the sections (2a–13b) of the air conveyer (2), of the container conveyor (9), as well as of the rolling conveyor (11 and 13), are also influenced by the change of speed by the control device (6).

For the supplying of power, the electrical motors of the transport mechanism are connected, in the known manner, with a power bus (18) (FIG. 2), which is not depicted in FIG. 1. The motors (M2a–M13b) involve drive units which can be adjusted in their rotational speed in a pole-shiftable or continuous manner. Rotary field motors (asynchronous or synchronous motors) are preferably used.

Frequency converters are provided for the adjustment of rotational speed, whereby each motor preferably has its own frequency converter (14'), which is coordinated in a local and direct manner. These frequency converters (14') are components of control modules, or even form control modules (14) for the motors (FIG. 2), and can be attached to the motor casing as a joint subassembly.

The sensors (15) (photo sensor assemblies, key switches, proximity initiators, or the like) and/or actuators (bottle discharge devices, stoppers, or distributing deflectors), which are coordinated with the specific transporter sections (7b, 7c), for example, are connected with the individual control modules (14).

At least one wirelessly-operating signal receiver, but preferably a signal receiving- and transmitting unit (16) for the exchange of bi-directional signals with the control device (6), however, is coordinated with the control modules (14). The signal receiving- and transmitting unit (16) ideally forms a construction unit which is configured in common with the specific control module (14).

The control device (6) has at least one wireless operating signal transmitter, particularly a combined signal receiving- and transmitting unit (17). The signal transmission is carried out, in this form of implementation, by means of radio. In an alternative manner, an optical electronic transmission (such as by means of infrared, for example) would also be conceivable.

Figure 2:
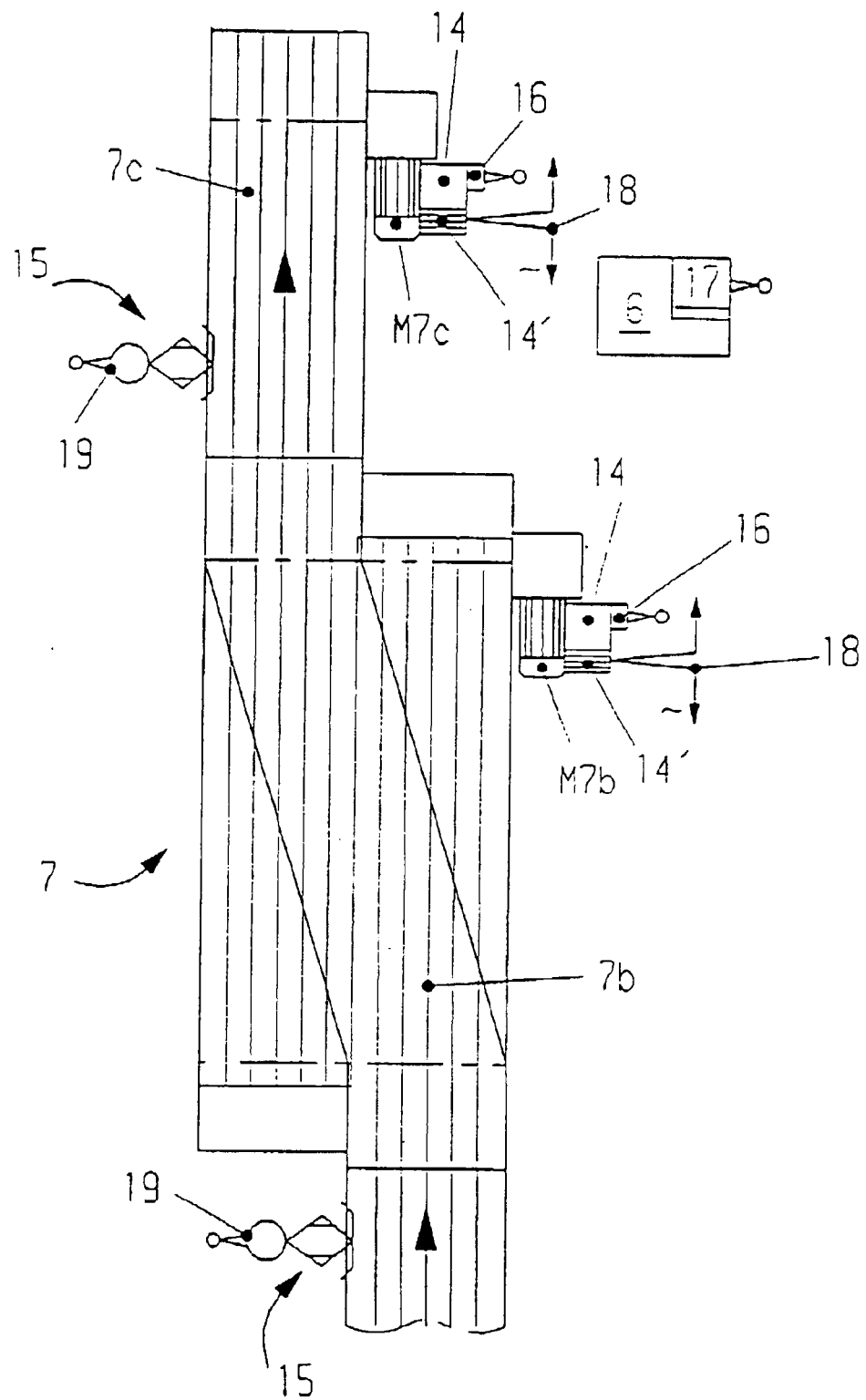
FIG. 2: Depicts a cross-section through a beverage decanting line, in an enlarged representation.

In accordance with FIG. 2, the sensors (15) provided for the determination of the transporter loading can be equipped with one signal transmitting unit (19) each, as the result of which a wiring with the control modules (14) is superfluous. Batteries and/or rechargeable batteries can be provided in order to supply power to the sensors. A self-generating operation by means of a generator that can be driven by conveyor belts, or a supplying of power by means of solar cells which produce electrical energy from the lighting within the plant would also be conceivable.

A transport mechanism corresponding to FIG. 1 preferably has a signal receiving- and transmitting unit (16) for every control module (14). Differing from that, several control modules can be connected in a combined manner with only one common signal receiving- and transmitting unit (16) each, such as by being coordinated with the conveying sections (2, 4, 7, 9, 11, 13), for example.

The processing machines (1, 3, 5, 8, 10, and 12), which have their own drive units integrated into the filling line, can likewise each be optionally equipped with a control module (not depicted) which has a wireless operating signal receiver and transmitting unit and, by that means, exchange signals with the control device (6) in a bi-directional manner.

The possibility exists for the control modules of the transporter sections and of the processing machines to exchange wireless signals with one another without mediation by the control device (6) or a control module, as the case may be, which takes over the function of the central control device (6), and for the signal exchange to be handled by way of this control module, so that a separate control device (6) can, if necessary, be dispensed with.

The control modules (14) can be equipped with data storage memories for the interim buffering of signal data or the storage of control programs.

In order to avoid disturbances and defective controls, it can be advantageous to only control the signal exchange in coded form, and to only allow control commands to proceed after previous acknowledgement by the receiver provided.

What is claimed is:

1. A transport mechanism for piece goods such as bottles, cans, cardboards and trays, comprising: at least two transporter sections (2a–13b), each transporter section (2a–13b) having at least one drive unit (M2a–M13b), each drive unit being adjustable in rotary speed and having a coordinated control module (14), whereby each control module (14) is connected with a central control-regulating unit (6) for the transmission of a wireless signal, the control-regulating unit (6) having at least one transmitter (17), each control module (14) having at least one receiver (16) for the wireless signal transmission, wherein one of the control modules (14) serves as a the control-regulating unit, and the wireless signal transmission with the individual control modules (14) can be mediated by way of this control module, which takes over the function of the control-regulating unit.

2. A transport mechanism in accordance with claim 1, wherein the control-regulating unit (6) and the control module (14) each has a transmitter and a receiver (16, 17) for bi-directional wireless signal transmission.

3. A transport mechanism in accordance with claim 1, and one of sensors (15), actuators, and sensor-actuators are coordinated with the individual transporter sections (2a–13b), the individual transporter sections (2a–13b) being connected with the corresponding control module (14) of the specific transporter sections for the purpose of wireless signal transmission.

4. A transport mechanism in accordance with claim 3, wherein the wireless signal transmission is bi-directional.

5. A transport mechanism in accordance with claim 1, wherein the several control modules exchange wireless signals with one another bi-directionally.

6. A transport mechanism in accordance with claim 1, and a power bus (18) for supplying power to the drive units (M2a to M13b) of the individual transporter sections (2a to 13b).

7. A transport mechanism in accordance with claim 1, wherein the transporter sections are configured as one of conveyor belts, rolling conveyors and air conveyors with a stationary framework.

8. A transport mechanism in accordance with claim 1, wherein individual transporter sections are formed by processing machines (1, 3, 5, 8, 10,12), including blowing-, cleaning-, inspection-, filling-, sealing-, labeling-, packaging-, and palletizing machines, which are incorporated into the transport mechanism.

9. A transport mechanism in accordance with claim 8, wherein the processing machines (1, 3, 5, 8, 10, 12) each have at least one drive unit adjustable in rotary speed, a control module, and one of a transmitter and receiver for the wireless signal transmission.

10. A transport mechanism in accordance with claim 9, wherein the processing machines have transport elements which can be driven at changeable rotational speed, the transport elements comprising one of star wheels, conveyor belts, or pulley-, chain-, roller-, or air conveyors.

11. A transport mechanism in accordance with claim 8, wherein the rotational speed of the drive unit (M2a to M13b) of the transporter sections (2a to 13b) and of the processing machines (1, 3, 5, 8) is changeable, at least in areas, in a manner one of synchronously in common with one another and, in event of need, individually independently of one another.

12. A transport mechanism in accordance with claim 1, wherein one of a control module (14), a frequency converter (14'), and a signal receiving- and transmitting unit (16), each form a construction unit.

13. A transport mechanism in accordance with claim 1, wherein the control modules (14) have freely-programmable memory storage.

14. A transport mechanism in accordance with claim 1, wherein the transport mechanism is a component of one of a filling- and packaging line for beverages or foods.

15. A transport mechanism in accordance with claim 1, and wherein the wireless signal transmission is a radio transmission.

16. A transport mechanism in accordance with claim 9, wherein the wireless signal transmission is bi-directional.

17. A transport mechanism for piece goods such as bottles, cans, cardboards and trays. comprising: at least two transporter sections (2a–13b), each transporter section (2a–13b) having at least one drive unit (M2a–M13b), each drive unit being adjustable in rotary speed and having a coordinated control module (14), whereby each control module (14) is connected with a central control-regulating unit (6) for the transmission of a wireless signal, the control-regulating unit (6) having at least one transmitter (17), each control module (14) having at least one receiver (16) for the wireless signal transmission, one of sensors (15), actuators, and sensor-actuators are coordinated with the individual transporter sections (2a–13b), the individual transporter sections (2a–13b) being connected with the corresponding control module (14) of the specific transporter sections for the purpose of wireless signal transmission, and wherein the supplying of power to the sensors, and actuators, and sensor-actuators is carried out by means of one of coordinated batteries, rechargeable batteries, solar cells and a generator that can be driven by the transport mechanism.

18. A transport mechanism for piece goods such as bottles, cans, cardboards, trays or the like, comprising at least two transporter sections, each transporter section having at least one drive unit, each drive unit being adjustable in rotary speed and having a coordinated control module, whereby each control module is connected with a central control-regulating unit for the transmission of a wireless signal, the control-regulating unit having at least one transmitter, and each control module having at least one receiver for the wireless signal transmission, wherein the drive unit has a casing and one of a control module, a frequency converter, and a signal-receiving- and transmitting unit, each form a construction unit which is positioned on the casing.

* * * * *

UNITED STATES PATENT AND TRADEMARK OFFICE
CERTIFICATE OF CORRECTION

PATENT NO. : 6,793,065 B2
DATED : September 21, 2004
INVENTOR(S) : Manfred Ziegler It is certified that error appears in the above-identified patent and that said Letters Patent is hereby corrected as shown below:

Title page,
Item [57], ABSTRACT,
Line 1, please delete "can" and replace with -- cans --.

Column 4,
Line 44, please delete "What is claimed is:" and replace with -- I Claim: --.
Line 56, please delete "as a the" and replace with -- as the --.

Column 5,
Line 15, delete "rolling conveyors" and replace with -- rolling conveyors, --.

Column 6,
Line 10, please delete "trays." and replace with -- trays, --.
Line 26, please delete "and actuators," and replace with -- actuators, --.

Signed and Sealed this

Nineteenth Day of April, 2005

JON W. DUDAS
*Director of the United States Patent and Trademark Office*